United States Patent
Gopalakrishnan

(10) Patent No.: US 10,178,125 B2
(45) Date of Patent: Jan. 8, 2019

(54) STATELESS PREVENTION OF LOGIN-BASED CROSS-SITE REQUEST FORGERY

(71) Applicant: salesforce.com, inc., San Francisco, CA (US)

(72) Inventor: Amalkrishnan Chemmany Gopalakrishnan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 129 days.

(21) Appl. No.: 15/145,484

(22) Filed: May 3, 2016

(65) Prior Publication Data
US 2017/0324742 A1 Nov. 9, 2017

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ........ *H04L 63/168* (2013.01); *H04L 63/1483* (2013.01); *H04L 63/0428* (2013.01); *H04L 63/102* (2013.01)

(58) Field of Classification Search
USPC .......................................................... 726/9
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

OTHER PUBLICATIONS

U.S. Appl. No. 13/986,251, Apr. 16, 2013.

*Primary Examiner* — Brandon S Hoffman
*Assistant Examiner* — Samuel Ambaye
(74) *Attorney, Agent, or Firm* — Dergosits & Noah LLP; Todd A. Noah

(57) ABSTRACT

A web application receives a request for a web site's login page. The web application sends, via a domain name, a response including the login page, a first token in a first field in the login page's header, and a second token in a second field in the login page's header, wherein the first field is modifiable only via a related domain name which is related to the domain name, and wherein the first token is a function of the second token. The web application receives a request to login to the site from a client, wherein the request to login includes a header that includes the first field and the second field. The web application establishes a session with the client if the first field in the header includes a token which is the function of a token in the second field in the header.

20 Claims, 3 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0204148 A1* | 9/2005 | Mayo ............... H04L 63/0815 |
| | | 713/185 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0054846 A1* | 3/2012 | Lightsey ........... H04L 63/1441 |
| | | 726/9 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0347093 A1* | 12/2013 | von Krogh ............ G06F 21/34 |
| | | 726/9 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

\* cited by examiner

STATELESS PREVENTION OF LOGIN-BASED CROSS-SITE REQUEST FORGERY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Web sites which are supported by web applications that base security on state changing operations can be vulnerable to cross-site request forgery. Login cross-site request forgery is a specific type of request forgery that tricks a web user to login to an attacker controlled account on a vulnerable web site. Most web applications have login mechanisms with no protection against login cross-site request forgery. An attacker can trick a user into logging in to an attacker controlled account when the user's web browser visits the attacker's web site, which has, for example, hyper-text markup language (HTML) code that instructs the user's web browser to make a cross-site login request to a vulnerable web site using the attacker's login parameters. If a vulnerable web site supports login over, for example, the hyper-text transfer protocol (HTTP) GET method, an attacker can trick a user into logging in to an attacker controlled account created for the vulnerable web site if the user's web browser selects an attacker-designed uniform resource locator (URL) which hides the attacker's login parameters from the user. In either case, the user may not realize that a session has been established with the vulnerable web site via an attacker controlled account, and may use the vulnerable web site as usual. If the vulnerable web site is a search engine, the attacker would have full access to the unsuspecting user's search queries, which may be of a sensitive nature, and any other activity tracked by the search engine, thereby violating the user's confidentiality expectations. If the vulnerable web site is a customer relationship management system, the attacker would have full access to the unsuspecting user's entry of data, such as lead or account information, thereby violating the user's confidentiality expectations.

Defending against a login cross-site request forgery is different from defending against a standard cross-site request forgery attack because this login attack does not require the targeted user to be already logged into the vulnerable web site. Since the user's access to the vulnerable web site is through the login feature, a web application for the vulnerable web site cannot send the user a token which can prevent the login attack because the user has not yet established any session with which the web application can associate the token. If the web application for the vulnerable web site provides a token to a user as a required parameter for logging in, an attacker could easily reuse the required parameter in the attacker's login parameters.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
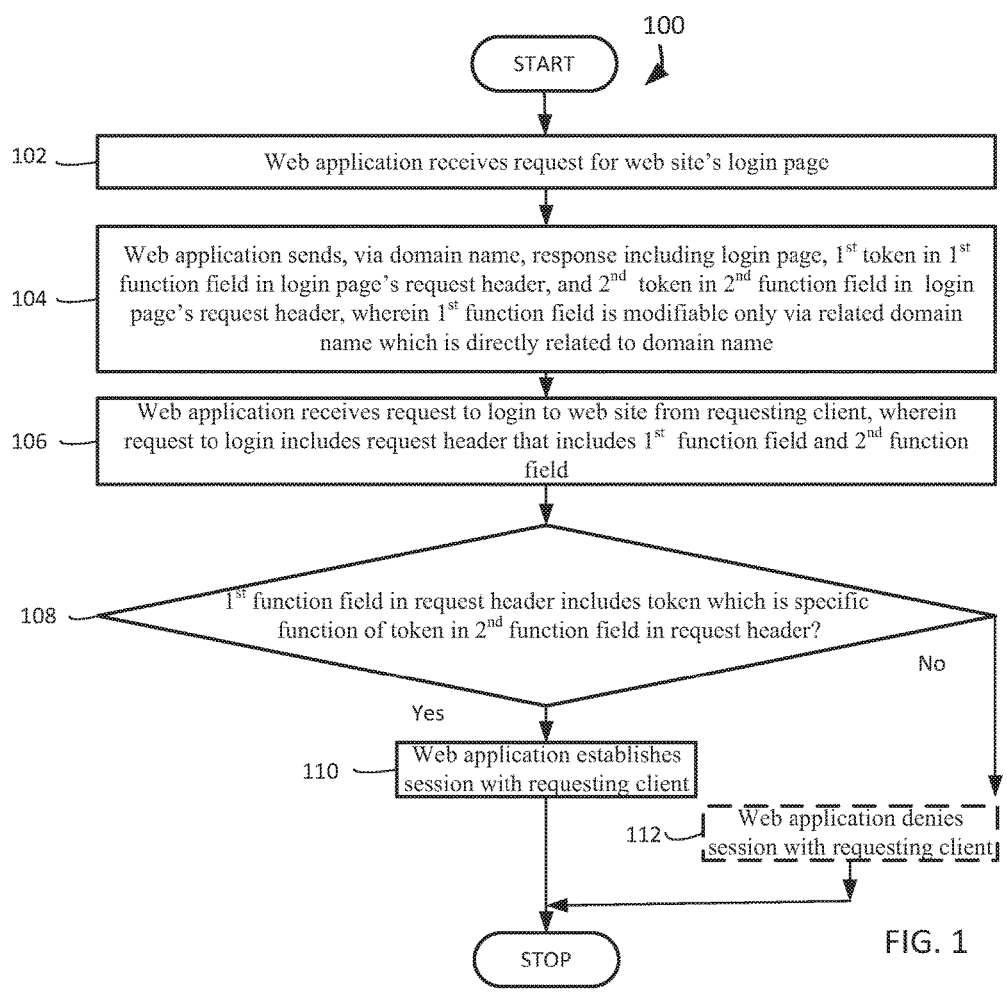
FIG. 1 depicts an operational flow diagram illustrating a high level overview of a method for stateless prevention of login-based cross-site request forgery, in an embodiment.

Systems and methods are provided for stateless prevention of login-based cross-site request forgery. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for stateless prevention of login-based cross-site request forgery will be described with reference to example embodiments. The following detailed description will first describe a method for stateless prevention of login-based cross-site request forgery.

In accordance with embodiments described herein, there are provided methods and systems for stateless prevention of login-based cross-site request forgery. A web application receives a request for a web site's login page. The web application sends, via a domain name, a response including the login page, a first token in a first function field in the login page's request header, and a second token in a second function field in the login page's request header, wherein the first function field is modifiable only via a related domain name which is directly related to the domain name. The web application receives a request to login to the web site from a requesting client, wherein the request to login includes a request header that includes the first function field and the second function field. The web application establishes a session with the requesting client if the first function field in the request header includes a token which is the specific function of a token in the second function field in the request header.

For example, the invulnerable.com web application receives a HTTP request for the invulnerable.com login page from John Smith's client device. The invulnerable.com web application sends, via the domain name invulnerable.com, a HTTP response to John Smith's client device. The HTTP response includes the invulnerable.com login page, the cryptographically random value 9a8b7c6d in a custom header of the login page's request header, and a HMAC hash value of the value 9a8b7c6d in a GET parameter of the login page's request header. The HTTP custom header is modifiable only via a domain name which is directly related to invulnerable.com. The invulnerable.com web application receives a HTTP request to login to the invulnerable.com web site from John Smith's client device. The HTTP request to login includes a request header that includes the custom header and GET parameter. The invulnerable.com web application establishes a session with John Smith's client device because the request header's custom header includes a value which is the HMAC hash value of the request header's GET parameter value.

While one or more implementations and techniques are described with reference to an embodiment in which stateless prevention of login-based cross-site request forgery is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed. Furthermore, while the following discussion describes examples using the HTTP stateless protocol, one skilled in the art would understand that the methods and systems described herein would apply to other request-response application protocols, such as TCP/IP, FTP, AFS, WAP, etc.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 depicts an operational flow diagram illustrating a high level overview of a method 100 for stateless prevention of login-based cross-site request forgery. A web application receives a request for a web site's login page, block 102. For example and without limitation, this can include an invulnerable.com web application receiving a HTTP request for the invulnerable.com login page from John Smith's client device. In another example, the invulnerable.com web application receives a HTTP request for the invulnerable.com login page from an attacker's client device.

After receiving a request for web site's login page, a web application sends, via a domain name, a response including the login page, a first token associated with a first function field in the login page's request header, and a second token associated with a second function field in the login page's request header, wherein the first function field is modifiable only via a related domain name which is directly related to the domain name, block 104. By way of example and without limitation, this can include the invulnerable.com web application sending, via the domain name invunerable.com, a HTTP response to John Smith's client device. The HTTP response includes the invulnerable.com login page, the cryptographically random value 9a8b7c6d in a custom header of the login page's HTTP request header, and a HMAC hash value of the value 9a8b7c6d in a GET parameter of the login page's HTTP request header.

Although this example describes the use of the HMAC (Hash-based Message Authentication Code) hash function, any cryptographic hash function may be used. While this example describes one token as a hash-based function of the other token, one token may be equal to the other token. Whereas this example describes the GET parameter's value as a hash-based function of the custom header's value, the custom header's value may be a hash-based function of the GET parameter's value. While this example describes the use of a HTTP GET parameter, a HTTP post parameter may be used. This example describes the combination of function fields as a custom header and a GET parameter, but other combinations of function fields may be used, such as a custom header and a cookie, or a cookie and a GET parameter. Using a custom header is the strongest implementation from a security perspective because a custom header is modifiable only via the domain name through which the custom header was provided, such as invulnerable.com. A cookie may be combined with a GET parameter for use cases with looser security restrictions, because a cookie is modifiable only via a related domain name that is directly related to the domain name through which the custom header was provided, such as invulnerable.com/searchengine, invulnerable.com/crms, or invulnerable.com. Even though these examples describe using a request, a request header, a custom header, a GET parameter, a cookie, and a response which are associated with the hyper-text transfer protocol (HTTP), a request, a request header, a custom header, a GET parameter, a cookie, and a response may be used which are associated with another protocol, such as TCP/IP, FTP, AFS, WAP, etc.

In another example, the invulnerable.com web application sends, via the domain name invunerable.com, a HTTP response to an attacker's client device. This HTTP response includes the invulnerable.com login page, the cryptographically random value 1z2y3x4w in a custom header of the login page's request header, and a HMAC hash value of the value 1z2y3x4w in a GET parameter of the login page's request header. Even if the attacker modifies the unsuspecting user's GET parameter to include a previously sent function field value and the attacker's login parameters, the attacker cannot control the randomly changing custom header's value which is used by the web application to determine whether to establish a connection for the unsuspecting user.

Having sent a response including a login page, a web application receives a request to login to a web site from a requesting client, wherein the request to login includes a request header that includes a first function field and a second function field, block 106. In embodiments, this can include the invulnerable.com web application receiving a HTTP request to login to the invulnerable.com web site from John Smith's client device. The HTTP request to login includes a request header that includes the custom header and GET parameter. In another example, the invulnerable.com web application receives a HTTP request to login to the invulnerable.com web site from Jane Jones' client device, which is requesting to login to the invulnerable.com web site using the attacker's login parameters. This HTTP request to login also includes a request header that includes the HTTP custom header and GET parameter. If the web application receives a request to login which does not include a request header that includes the previously sent first function field and second function field, the web application denies the requested session with the requesting client.

After receiving a request to login to a web site from a requesting client, a web application determines whether a first function field in a request header includes a token which is a specific function of a token in a second function field in the request header, block 108. For example and without limitation, this can include the invulnerable.com web application determining whether the HTTP request header's custom header includes a value which is the HMAC hash value of the value of the request header's GET parameter. While this example describes a web application determining whether one token is a hash-based function of the other token, the web application may determine whether one token is equal to the other token. The web application provides stateless prevention of login-based cross-site request forgery because the web application simply compares the two values received in the login request instead of having to maintain the state of any previously sent value, which makes this stateless prevention inexpensive and very scalable.

If the first function field in the request header includes a token which is a specific function of the token in the second function field in the request header, the method 100 continues to block 110. If the first function field in the request header does not include a token which is a specific function of the token in the second function field in the request header, the method 100 proceeds to block 112.

If the first function field in the request header includes a token which is the specific function of the token in the second function field in the request header, the web application establishes a session with the requesting client, block 110. By way of example and without limitation, this can include the invulnerable.com web application establishing the requested session with John Smith's client device because the request header's custom header includes a value which is the HMAC hash value of the value of the request header's GET parameter. While this example describes a web application establishing the requested session based on one token being a hash-based function of the other token, the web application may establish the requested session based on one token being equal to the other token.

If the first function field in the request header does not include a token which is the specific function of the token in the second function field in the request header, the web application optionally denies a session with the requesting client, block 112. In embodiments, this can include the invulnerable.com web application denying the requested session with Jane Jones' client device because the attacker modified the GET parameter to provide the attacker's login parameters, such that the request header's custom header does not includes a value which is the HMAC hash value of the value of the request header's GET parameter. While this example describes a web application denying the requested session based on one token not being a hash-based function of the other token, the web application may deny the requested session based on one token not being equal to the other token.

The web application provides an effective defense against login cross-site request forgery because an attacker cannot control the values of the tokens for both function fields provided by the web application. The custom header is modifiable only via the domain name through which the custom header was provided, such as invulnerable.com, and the cookie is modifiable only via a related domain name that is directly related to the domain name through which the custom header was provided, such as invulnerable.com/searchengine, invulnerable.com/crms, or invulnerable.com.

The method 100 may be repeated as desired. Although this disclosure describes the blocks 102-112 executing in a particular order, the blocks 102-112 may be executed in a different order. In other implementations, each of the blocks 102-112 may also be executed in combination with other blocks and/or some blocks may be divided into a different set of blocks.

System Overview

Figure 2:
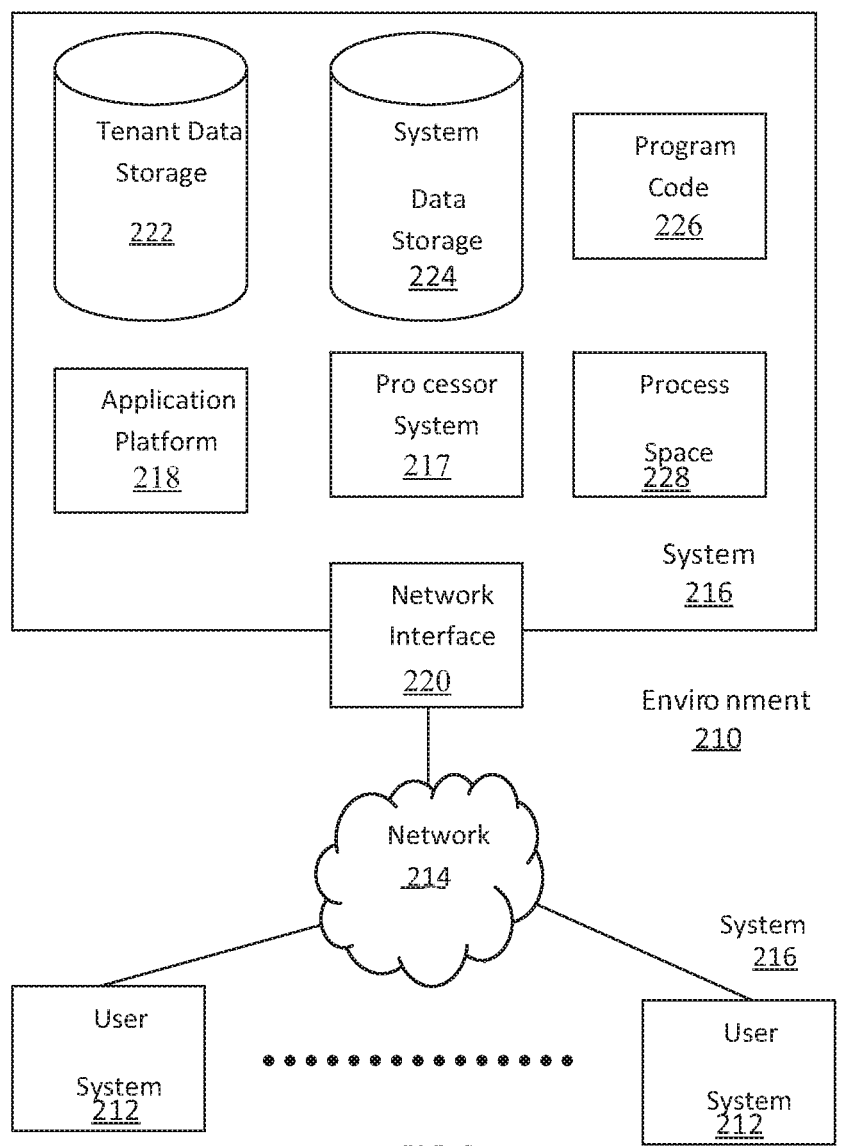
FIG. 2 illustrates a block diagram of an example of an environment wherein an on-demand database service might be used.

FIG. 2 illustrates a block diagram of an environment 210 wherein an on-demand database service might be used. The environment 210 may include user systems 212, a network 214, a system 216, a processor system 217, an application platform 218, a network interface 220, a tenant data storage 222, a system data storage 224, program code 226, and a process space 228. In other embodiments, the environment 210 may not have all of the components listed and/or may have other elements instead of, or in addition to, those listed above.

The environment 210 is an environment in which an on-demand database service exists. A user system 212 may be any machine or system that is used by a user to access a database user system. For example, any of the user systems 212 may be a handheld computing device, a mobile phone, a laptop computer, a work station, and/or a network of computing devices. As illustrated in FIG. 2 (and in more detail in FIG. 3) the user systems 212 might interact via the network 214 with an on-demand database service, which is the system 216.

An on-demand database service, such as the system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, users accessing the on-demand database service via user systems 212, or third party application developers accessing the on-demand database service via the user systems 212.

The users of the user systems 212 may differ in their respective capacities, and the capacity of a particular user system 212 might be entirely determined by permissions (permission levels) for the current user. For example, where a salesperson is using a particular user system 212 to interact with the system 216, that user system 212 has the capacities allotted to that salesperson. However, while an administrator is using that user system 212 to interact with the system 216, that user system 212 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTP, FTP, AFS, WAP, etc. In an example where HTTP is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 216, shown in FIG. 2, implements a web-based customer relationship management (CRM) system. For example, in one embodiment, the system 216 includes application servers configured to implement and execute CRM software applications as well as provide related data, code, forms, webpages and other information to and from the user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 216 implements applications other than, or in addition to, a CRM application. For example, the system 216 may provide tenant access to multiple hosted (standard and custom) applications, including a CRM application. User (or third party developer) applications, which may or may not include CRM, may be supported by the application platform 218, which manages creation, storage of the applications into one or more database objects and executing of the applications in a virtual machine in the process space of the system 216.

One arrangement for elements of the system 216 is shown in FIG. 2, including the network interface 220, the application platform 218, the tenant data storage 222 for tenant data 223, the system data storage 224 for system data 225 accessible to the system 216 and possibly multiple tenants, the program code 226 for implementing various functions of the system 216, and the process space 228 for executing MTS system processes and tenant-specific processes, such as running applications as part of an application hosting service. Additional processes that may execute on the system 216 include database indexing processes.

Several elements in the system shown in FIG. 2 include conventional, well-known elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 216 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 216 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the user (client) systems 212 to support the access by the user systems 212 as tenants of the system 216. As such, the system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 3:
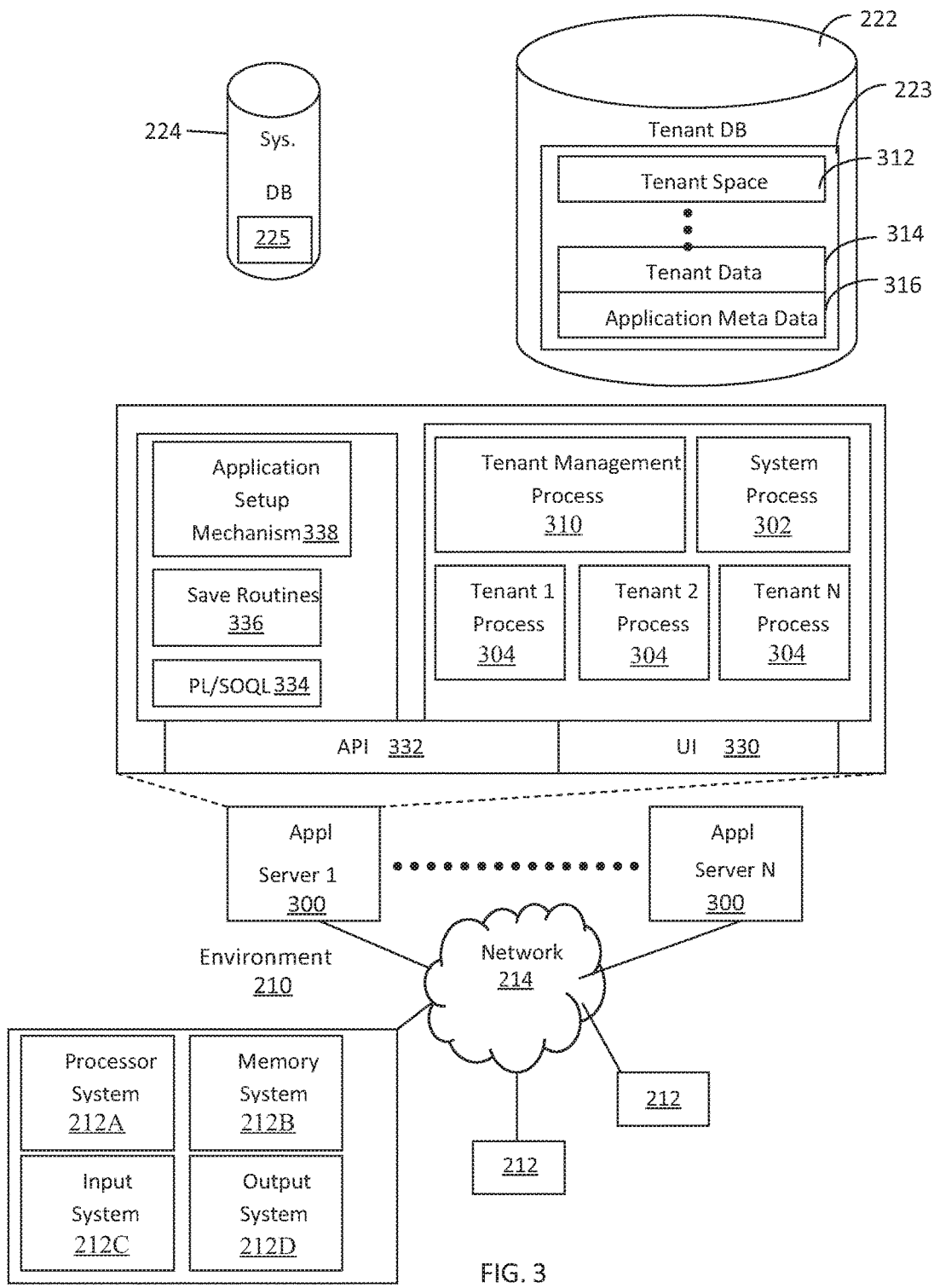
FIG. 3 illustrates a block diagram of an embodiment of elements of FIG. 2 and various possible interconnections between these elements.

FIG. 3 also illustrates the environment 210. However, in FIG. 3 elements of the system 216 and various interconnections in an embodiment are further illustrated. FIG. 3 shows that the each of the user systems 212 may include a processor system 212A, a memory system 212B, an input system 212C, and an output system 212D. FIG. 3 shows the network 214 and the system 216. FIG. 3 also shows that the system 216 may include the tenant data storage 222, the tenant data 223, the system data storage 224, the system data 225, a User Interface (UI) 330, an Application Program Interface (API) 332, a PL/SOQL 334, save routines 336, an application setup mechanism 338, applications servers $300_1$-$300_N$, a system process space 302, tenant process spaces 304, a tenant management process space 310, a tenant storage area 312, a user storage 314, and application metadata 316. In other embodiments, the environment 210 may not have the same elements as those listed above and/or may have other elements instead of, or in addition to, those listed above.

The user systems 212, the network 214, the system 216, the tenant data storage 222, and the system data storage 224 were discussed above in reference to FIG. 2. Regarding the user systems 212, the processor system 212A may be any combination of one or more processors. The memory system 212B may be any combination of one or more memory devices, short term, and/or long term memory. The input system 212C may be any combination of input devices, such as one or more keyboards, mice, trackballs, scanners, cameras, and/or interfaces to networks. The output system 212D may be any combination of output devices, such as one or more monitors, printers, and/or interfaces to networks. As shown by FIG. 3, the system 216 may include the network interface 220 (of FIG. 2) implemented as a set of HTTP application servers 300, the application platform 218, the tenant data storage 222, and the system data storage 224. Also shown is the system process space 302, including individual tenant process spaces 304 and the tenant management process space 310. Each application server 300 may be configured to access tenant data storage 222 and the tenant data 223 therein, and the system data storage 224 and the system data 225 therein to serve requests of the user systems 212. The tenant data 223 might be divided into individual tenant storage areas 312, which can be either a physical arrangement and/or a logical arrangement of data. Within each tenant storage area 312, the user storage 314 and the application metadata 316 might be similarly allocated for each user. For example, a copy of a user's most recently used (MRU) items might be stored to the user storage 314. Similarly, a copy of MRU items for an entire organization that is a tenant might be stored to the tenant storage area 312. The UI 330 provides a user interface and the API 332 provides an application programmer interface to the system 216 resident processes to users and/or developers at the user systems 212. The tenant data and the system data may be stored in various databases, such as one or more Oracle™ databases.

The application platform 218 includes the application setup mechanism 338 that supports application developers' creation and management of applications, which may be saved as metadata into the tenant data storage 222 by the save routines 336 for execution by subscribers as one or more tenant process spaces 304 managed by the tenant management process 310 for example. Invocations to such applications may be coded using the PL/SOQL 334 that provides a programming language style interface extension to the API 332. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 316 for the subscriber making the invocation and executing the metadata as an application in a virtual machine.

Each application server 300 may be communicably coupled to database systems, e.g., having access to the system data 225 and the tenant data 223, via a different network connection. For example, one application server $300_1$ might be coupled via the network 214 (e.g., the Internet), another application server $300_{N-1}$ might be coupled via a direct network link, and another application server $300_N$ might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also can be used. For example, in certain embodiments, three consecutive requests from the same user could hit three different application servers 300, and three requests from different users could hit the same application server 300. In this manner, the system 216 is multi-tenant, wherein the system 216 handles storage of, and access to, different objects, data and applications across disparate users and organizations.

As an example of storage, one tenant might be a company that employs a sales force where each salesperson uses the system 216 to manage their sales process. Thus, a user might maintain contact data, leads data, customer follow-up data, performance data, goals and progress data, etc., all applicable to that user's personal sales process (e.g., in the tenant data storage 222). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 216 might also maintain system level data usable by multiple tenants or other data. Such system level data might include industry reports, news, postings, and the like that are sharable among tenants.

In certain embodiments, the user systems 212 (which may be client systems) communicate with the application servers 300 to request and update system-level and tenant-level data from the system 216 that may require sending one or more queries to the tenant data storage 222 and/or the system data storage 224. The system 216 (e.g., an application server 300 in the system 216) automatically generates one or more SQL statements (e.g., one or more SQL queries) that are designed to access the desired information. The system data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for stateless prevention of login-based cross-site request forgery, the apparatus comprising:
   one or more processors; and
   a non-transitory computer readable medium storing a plurality of instructions, which when executed, cause the one or more processors to:
   receive, by a web application, a request for a login page associated with a web site;
   send, by the web application via a domain name, a response comprising the login page and a request header of the login page, the request header of the login page including a first function field having a first token and a second function field having a second token, the first function field being modifiable only via a related domain name that is related to the domain name;

receive, by the web application, a request to login to the web site from a requesting client, wherein the request to login comprises a request header that comprises the first and second function fields;

determine, by the web application, whether the first function field in the request header comprises a token that is a specific function of a token in the second function field in the request header; and establish, by the web application, a session with the requesting client in response to a determination that the first function field in the request header comprises the token which is the specific function of the token in the second function field in the request header.

2. The system of claim 1, wherein at least one of the first token and the second token is cryptographically random.

3. The system of claim 1, wherein the first function field comprises one of a custom header and a cookie.

4. The system of claim 1, wherein the second function field comprises one of a GET parameter and a cookie.

5. The system of claim 1, wherein the related domain name which is directly related to the domain name comprises only the domain name.

6. The system of claim 1, wherein the specific function is one of an equality function and a hash-based function.

7. The system of claim 1, comprising further instructions, which when executed, cause the one or more processors to deny, by the web application, the session with the requesting client in response to a determination that the first function field in the request header does not comprise the token that is the specific function of the token in the second function field in the request header.

8. A computer program product comprising computer-readable program code to be executed by one or more processors when retrieved from a non-transitory computer-readable medium, the program code including instructions to:

receive, by a web application, a request for a login page associated with a web site;

send, by the web application via a domain name, a response comprising the login page and a request header of the login page, the request header of the login page including a first function field having a first token and a second function field having a second token, the first function field being modifiable only via a related domain name that is related to the domain name;

receive, by the web application, a request to login to the web site from a requesting client, wherein the request to login comprises a request header that comprises the first and second function fields;

determine, by the web application, whether the first function field in the request header comprises a token that is a specific function of a token in the second function field in the request header; and establish, by the web application, a session with the requesting client in response to a determination that the first function field in the request header comprises the token which is the specific function of the token in the second function field in the request header.

9. The computer program product of claim 8, wherein at least one of the first token and the second token is cryptographically random.

10. The computer program product of claim 8, wherein the first function field comprises one of a custom header and cookie.

11. The computer program product of claim 8, wherein the second function field comprises one of a GET parameter and a cookie.

12. The computer program product of claim 8, wherein the related domain name which is directly related to the domain name comprises only the domain name.

13. The computer program product of claim 8, wherein the specific function is one of an equality function and a hash-based function.

14. The computer program product of claim 8, wherein the program code comprises further instructions to deny, by the web application, the session with the requesting client in response to a determination that the first function field in the request header does not comprise the token that is the specific function of the token in the second function field in the request header.

15. A method for stateless prevention of login-based cross-site request forgery, the method comprising:

receiving, by a web application, a request for a login page associated with a web site;

sending, by the web application via a domain name, a response comprising the login page and a request header of the login page, the request header of the login page including a first function field having a first token and a second function field having a second token, the first function field being modifiable only via a related domain name that is related to the domain name;

receiving, by the web application, request to login to the web site from a requesting client, wherein the request to login comprises a request header that comprises the first and second function fields;

determining, by the web application, whether the first function field in the request header comprises a token that is a specific function of a token in the second function field in the request header; and establishing, by the web application, a session with the requesting client in response to a determination that the first function field in the request header comprises the token which is the specific function of the token in the second function field in the request header.

16. The method of claim 15, wherein at least one of the first token and the second token is cryptographically random.

17. The method of claim 15, wherein the first function field comprises one of a custom header and a cookie, and wherein the second function field comprises one of a GET parameter and the cookie.

18. The method of claim 15, wherein the related domain name which is directly related to the domain name comprises only the domain name.

19. The method of claim 15, wherein the specific function is one of an equality function and a hash-based function.

20. The method of claim 15, wherein the method further comprises denying, by the web application, the session with the requesting client in response to a determination that the first function field in the request header does not comprise the token that is the specific function of the token in the second function field in the request header.

* * * * *